United States Patent
Lubic et al.

(10) Patent No.: US 10,070,642 B2
(45) Date of Patent: Sep. 11, 2018

(54) MOUSETRAP WITH DISPOSABLE, HERMETICALLY SEALING CARTRIDGE AND INTERNAL HIGH-VOLTAGE KILLING MECHANISM

(75) Inventors: Marko K. Lubic, Shillington, PA (US); Andrew Gauker, Shillington, PA (US); Christopher J. Kamery, Buffalo, NY (US)

(73) Assignee: WOODSTREAM CORPORATION, Lititz, PA (US)

( * ) Notice: Subject to any disclaimer, the term of this patent is extended or adjusted under 35 U.S.C. 154(b) by 1811 days.

(21) Appl. No.: 13/409,701

(22) Filed: Mar. 1, 2012

(65) Prior Publication Data

US 2012/0285075 A1 Nov. 15, 2012

Related U.S. Application Data

(60) Provisional application No. 61/457,332, filed on Mar. 2, 2011.

(51) Int. Cl.
| | |
|---|---|
| *A01M 23/00* | (2006.01) |
| *A01M 23/38* | (2006.01) |
| *A01M 23/02* | (2006.01) |
| *A01M 23/14* | (2006.01) |
| *A01M 23/08* | (2006.01) |
| *A01M 31/00* | (2006.01) |

(52) U.S. Cl.
CPC ............ *A01M 23/38* (2013.01); *A01M 23/02* (2013.01); *A01M 23/08* (2013.01); *A01M 23/14* (2013.01); *A01M 31/002* (2013.01)

(58) Field of Classification Search
CPC ...... A01M 23/18; A01M 23/16; A01M 23/20; A01M 23/00; A01M 23/12; A01M 23/10; A01M 31/00; A01M 1/12; A01M 23/38; A01M 99/00; A01M 23/005; A01M 23/02; A01M 23/04; A01M 23/08; A01M 23/14
See application file for complete search history.

(56) References Cited

U.S. PATENT DOCUMENTS

| | | | | |
|---|---|---|---|---|
| 3,177,608 | A | * 4/1965 | Lindelow | A01M 23/18 43/61 |
| 4,418,493 | A | * 12/1983 | Jordan | A01M 23/18 43/61 |

(Continued)

FOREIGN PATENT DOCUMENTS

| | | | |
|---|---|---|---|
| DE | 3309464 A1 | * 10/1984 | ............ A01M 23/38 |
| EP | 990389 A1 | * 4/2000 | |

(Continued)

*Primary Examiner* — Tien Dinh
*Assistant Examiner* — George Andonyan
(74) *Attorney, Agent, or Firm* — Jacobson Holman, PLLC.

(57) ABSTRACT

A hermetically sealing, enclosure-type mousetrap is provided having a reusable housing and a disposable cartridge that contains an internal high voltage killing mechanism. Upon entry of a mouse into the cartridge through a rodent access opening, the opening is closed and the mouse is killed using the high voltage mechanism. Closure of the door hermetically seals the cartridge with the dead mouse inside, after which the cartridge can be disposed of without any contact between the user and the carcass along with any parasites and pathogens associated therewith.

7 Claims, 8 Drawing Sheets

(56) References Cited

U.S. PATENT DOCUMENTS

| | | | | | |
|---|---|---|---|---|---|
| 4,553,349 | A | * | 11/1985 | Tsai | A01M 23/06 43/70 |
| 4,566,218 | A | * | 1/1986 | Kurosawa | A01M 23/18 43/58 |
| 4,653,221 | A | * | 3/1987 | Pratscher | A01M 23/14 43/64 |
| 4,703,583 | A | * | 11/1987 | Dzurkovich | A01M 23/30 43/79 |
| 4,741,121 | A | * | 5/1988 | Pratscher | A01M 23/12 43/58 |
| 4,825,579 | A | * | 5/1989 | Dzurkovich | A01M 23/30 43/82 |
| 4,965,959 | A | * | 10/1990 | Gagne | A01M 1/06 43/58 |
| 5,083,704 | A | * | 1/1992 | Rounthwaite | B65F 1/0093 15/314 |
| 5,265,371 | A | * | 11/1993 | McCuistion | A01M 23/06 43/70 |
| 5,471,781 | A | * | 12/1995 | Vine | A01M 23/04 43/69 |
| 5,706,601 | A | * | 1/1998 | Dail | A01M 23/30 43/81 |
| 5,815,982 | A | * | 10/1998 | Garretson | A01M 1/103 43/111 |
| 5,926,997 | A | * | 7/1999 | Wilcox | A01M 1/026 43/121 |
| 5,953,853 | A | * | 9/1999 | Kim | A01M 23/02 43/61 |
| 6,016,623 | A | * | 1/2000 | Celestine | A01M 23/04 43/61 |
| 6,088,948 | A | * | 7/2000 | Ronnau | A01M 23/02 43/64 |
| 6,718,688 | B2 | * | 4/2004 | Garretson | A01M 1/026 43/111 |
| 6,735,899 | B1 | | 5/2004 | Anderson et al. | |
| 6,836,999 | B2 | * | 1/2005 | Rich | A01M 19/00 43/98 |
| 6,865,843 | B1 | * | 3/2005 | Jordan, Sr. | A01M 23/12 43/139 |
| 7,051,472 | B1 | * | 5/2006 | Kelly | A01M 1/023 43/58 |
| 7,363,744 | B2 | * | 4/2008 | Kness | A01M 23/08 43/58 |
| 8,151,514 | B2 | | 4/2012 | Bucher et al. | |
| 8,302,345 | B2 | * | 11/2012 | Nelson | A01M 25/004 43/114 |
| 8,857,102 | B2 | * | 10/2014 | Weisberg | A01M 23/08 43/61 |
| 2005/0235553 | A1 | * | 10/2005 | Rail | A01M 23/12 43/58 |
| 2007/0245617 | A1 | * | 10/2007 | Deibert | A01M 23/10 43/72 |
| 2008/0120895 | A1 | * | 5/2008 | Schwartz | A01M 23/12 43/61 |
| 2010/0146839 | A1 | * | 6/2010 | Cruz | A01M 23/38 43/99 |
| 2013/0312313 | A1 | * | 11/2013 | Lefkowitz | A01M 1/02 43/114 |
| 2014/0013649 | A1 | * | 1/2014 | Rivera | A01M 23/38 43/99 |
| 2015/0007485 | A1 | * | 1/2015 | Hortel | A01M 1/023 43/114 |

FOREIGN PATENT DOCUMENTS

| | | | | |
|---|---|---|---|---|
| FR | 2689371 A1 | * | 10/1993 | A01M 23/38 |
| GB | 2107164 A | * | 4/1983 | A01M 23/38 |
| GB | 2532862 A | * | 6/2016 | A01M 19/00 |
| KR | 20110028728 A | | 3/2011 | |
| KR | 20120090222 A | * | 8/2012 | |
| WO | WO 2008121011 A2 | * | 10/2008 | A01M 1/026 |

* cited by examiner

MOUSETRAP WITH DISPOSABLE, HERMETICALLY SEALING CARTRIDGE AND INTERNAL HIGH-VOLTAGE KILLING MECHANISM

This application is entitled to and hereby claims the priority of U.S. Provisional application Ser. No. 61/457,332, filed Mar. 2, 2011.

BACKGROUND OF THE INVENTION

Field of the Invention

The present invention is related to the field of rodent control and, more particularly, to a single or multiple use mousetrap that kills a mouse and encloses the carcass within a hermetically sealed disposable trap enclosure or cartridge.

Description of the Related Art

Present methods of capturing or disposing of rodents are generally unsightly and unsanitary. One such method includes a snap-trap which has a spring operated bar for instantly killing the rodent. This type of trap includes a spring operated bar which is released by a trigger which is baited. Because of their "snapping" action, snap traps are dangerous to humans and pets as well as to rodents, because they can all be struck by it. Furthermore, as mice and other rodents are typically nocturnal animals such devices most frequently capture the animals at night or during periods when people are not around. As such, the rodent may lie in the trap for many hours before removal and disposal. In addition to being unsightly, such capture is unsanitary as rodents are known to carry disease-causing fleas and lice which leave the carcass on death, and bacteria which can spread after the animal is killed. These drawbacks can be serious problems around food handling areas.

Another method of disposing of the rodents is by using poisoned bait which kills the rodent, sometimes by dehydration. The baited traps are also dangerous to children and pets because they may be tempted to taste the bait. Another disadvantage of this method is that the rodent may crawl into some inaccessible area after eating the poison and die there. This prevents disposal of the dead rodent and can result in an unpleasant odor.

SUMMARY OF THE INVENTION

In view of the foregoing, the present invention is directed to a mousetrap with an internal high voltage killing mechanism and one or more hermetically sealing enclosures or chambers that can be disposed of with the dead mouse contained therein. The trap is preferably configured with a reusable housing containing the high voltage circuitry, and a disposable cartridge that is received within the housing for use of the trap and then removed therefrom for disposal, along with the mouse therein, once a rodent has been dispatched.

Accordingly, it is an object of the present invention to provide an enclosure-type mousetrap that can be hermetically sealed in a tripped condition in order to protect the user from any exposure to the dead mouse.

Another object of the present invention is to provide a hermetically sealing mousetrap in accordance with the preceding object having a killing mechanism enclosed within a housing that is set from outside the housing.

A further object of the present invention is to provide a hermetically sealing mousetrap in accordance with the preceding objects that includes a door mechanism that provides for opening the door when the trap is placed in the set position and that automatically closes the door when the trap is triggered by entry of a mouse.

A still further object of the present invention is to provide a hermetically sealing mousetrap that is easy for the customer to use and also economical to produce.

Still another object of the present invention is to provide a single-use, hermetically sealing mousetrap in accordance with the preceding objects in which the internal killing mechanism is contained within a disposable cartridge that can be thrown away with the dead mouse contained therein.

A further object of the present invention is to provide a single-use, hermetically sealing mousetrap having a rigid base structure and a disposable cartridge that snaps into the base structure to set the trap.

Another object of the present invention is to provide a rodent trap that does not constitute a risk to humans and pets in the area, is easy to use and of simple construction, humanely kills the rodent, and enables the sanitary disposal of the dead rodent.

Yet another object of the present invention is to provide a hermetically sealing mousetrap that is not complex in structure, is reliable in operation and which can be manufactured at low cost but yet efficiently kills and sealingly contains the dead mouse and associated parasites and pathogens.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The present invention is directed to a hermetically sealing mousetrap for rodents. While multiple embodiments are disclosed herein, in each embodiment the trap includes a reusable housing containing the power and control components, and an enclosure or cartridge that can be disposed of after a single use with the dead mouse being contained therein.

Figure 1:
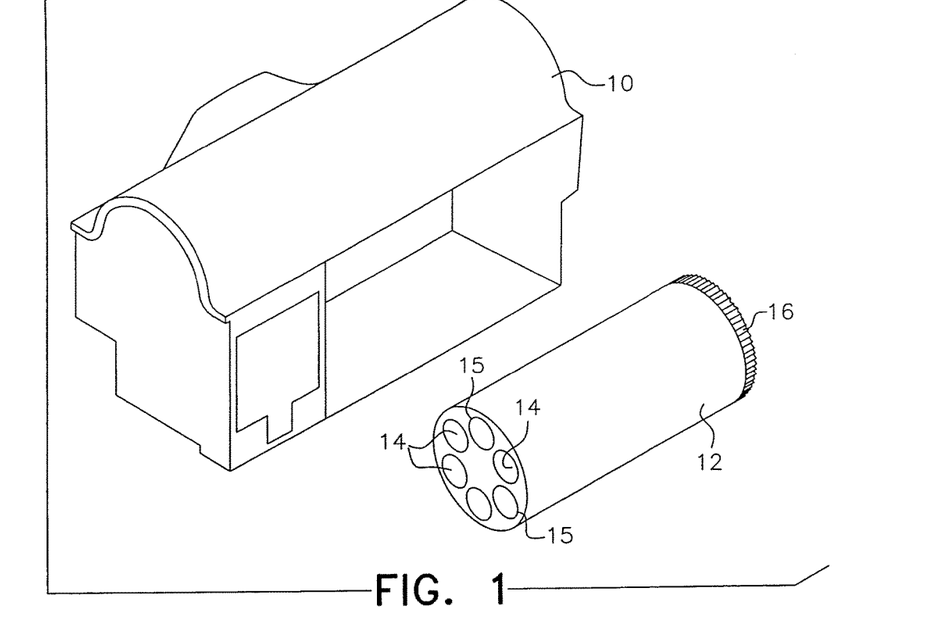
FIG. 1 is a perspective exploded view of the housing and disposable cartridge component, without its cover, of a first embodiment of a hermetically sealing mousetrap in accordance with the present invention.
Figure 2:
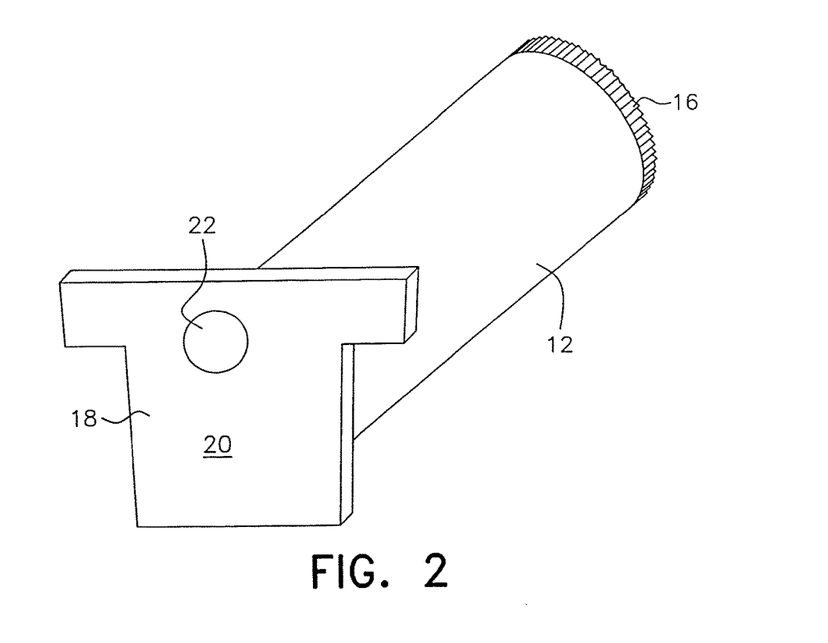
FIG. 2 is a perspective view of the disposable cartridge of FIG. 1 with its cover which can act as a keying element to facilitate installation of the cartridge into the housing.

According to a first embodiment shown in FIGS. 1 and 2, the trap includes a reusable housing 10 and a disposable cartridge 12. The housing 10 can be generally configured like that shown in co-pending application Ser. No. 12/213, 382 filed Jun. 18, 2008 ("the '382 application"), which is commonly owned by the assignee of the present invention. The '382 application is hereby expressly incorporated by reference as if fully set forth herein.

In the trap described in the '382 application, the housing encloses a rotating killing chamber that contains high voltage killing plates. When a rodent contacts two of the plates, the killing plates are activated to initiate a killing cycle which electrocutes the rodent as is described in the '382 application. Upon completion of the killing cycle, the chamber is rotated by a motor-driven mechanism to dump the dead rodent into a bin located beneath the killing chamber which can be removed to allow disposal of the rodents collected therein.

As in the '382 application, the housing 10 of the first embodiment of the present invention shown in FIGS. 1 and 2 contains a power source, controls and electronics (not shown) for rotating the disposable cartridge 12. These electronics may be similar to those described in the '382 application.

The disposable cartridge 12 may be received within the housing 10 in manner similar to the way in which the killing chamber of the '382 application is mounted in the housing. The cartridge 12 includes a plurality of chambers 14, each of which is configured to kill and contain a rodent, and a gear end 16 that cooperates with a corresponding gear (not shown) in the housing to enable the cartridge to be rotated to index the chambers 14. Only one chamber is accessible to a rodent at any given time through its respective access opening 15. Contacts (not shown) on the cartridge 12 and housing 10 provide the trap housing circuitry with cartridge position information as to which chamber is currently positioned to allow rodent access.

As shown in FIG. 2, the cartridge 12 is provided with a cover 18 that is "keyed" to facilitate installation into the trap housing. By "keyed" it is meant that the shape of the cover face 20 is complementary with a mounting structure inside the housing so that the cartridge can only be installed in the proper orientation within the housing. The cover face or wall 20 is solid with a single entry hole 22 therein that aligns with the chamber 14 that is currently "in use". The "in-use chamber" is the single active chamber which is currently aligned with the entrance opening (not shown) in the back of the housing 10 to allow entry of a rodent. The other chambers, both before and after being "in use", are effectively sealed by the solid wall 20 of the cover 18.

The inner surface of each chamber includes one or more killing plates (not shown for this embodiment), preferably made of thin sheet metal or other relatively inexpensive conductive material. As shown in connection with subsequent embodiments (see FIG. 14, for example), the killing plates have contact points that are coupled to a high voltage killing circuit contained with the housing that is capable of generating sufficient voltage to kill a rodent. The killing circuit may be configured as described in the '382 application and therefore will not be further discussed herein.

When the trap has been set, the trap automatically detects when a mouse has entered the "in use" chamber. The presence of a rodent may be sensed by means of a switch, a proximity sensor, an infrared beam, a passive infrared sensor or motion sensor, or other triggering means as would be understood by persons of ordinary skill in the art.

Once the rodent has been detected, the trap circuitry automatically initiates rotation of the cartridge to close the access opening to the cartridge. Rotation of the cartridge may be effected in a manner similar to that described in the '382 application. Once the access opening 15 to the "in use" chamber 14 has been rotated so as to be out of alignment with the entry door in the housing 10, the mouse is effectively sealed in the chamber 14 by the wall 20 of the cover 18. Thereafter, when the rodent contacts both plates the killing circuit is activated and voltage is applied to the killing plates in the active chamber to electrocute the rodent.

While using two plates and activating the killing circuit upon contact of the rodent with both plates is one preferred manner of operation, other ways of initiating activation of the circuit could also be used as long as a ground and voltage are provided. For example, a series of electrode probes could be placed in the cartridge killing chamber with the trap being activated when the rodent "touches" two of the probes simultaneously.

At the same time that rotation of the cartridge closes the access opening 15 to the "in use" chamber 14, the rotation of the cartridge 12, either clockwise or counter-clockwise depending on trap design, concurrently brings the next chamber's rodent access opening 15 into alignment with the entrance in the housing. When so aligned, the next chamber is queued to become the next "in use" chamber, and is ready for entry of the next mouse.

As is evident from the multiple chambered construction of the cartridge 12, the trap according to the first embodiment is capable of multiple uses before disposal of the cartridge. In the configuration shown, up to six mice can be caught and killed. Cartridges with more or fewer chambers could also be used as would be understood from the disclosure herein.

In a second embodiment of the present invention shown in FIGS. 3-6, a hermetically sealing mousetrap is provided having a rigid housing 30 that receives a "cartridge" in the form of a substantially D-shaped molded tube 32 having a motor driven plug 35 that is shaped to fit within a cylindrical part 31 of the tube. While the plug 35 and tube part 31 are shown as being cylindrical, alternatively the entire tube could be D-shaped with the plug also being O-shaped; other tube shapes and complementary plug shapes could also be used as would be understood from this disclosure. Whatever its overall shape, the tube cartridge 32 is inserted into the housing 30 with a snap fit that allows the tube cartridge to be easily removed for disposal and replacement with another tube cartridge.

Figure 3:
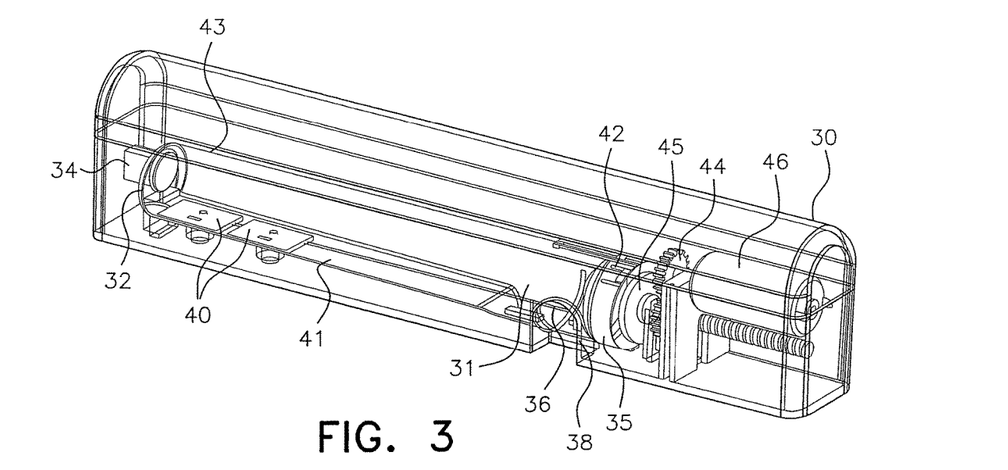
FIG. 3 is a perspective of a second embodiment of a hermetically sealing mousetrap in accordance with the present invention, with the housing depicted transparently in order to show the molded tube cartridge, motor and other components inside the housing.
Figure 4:
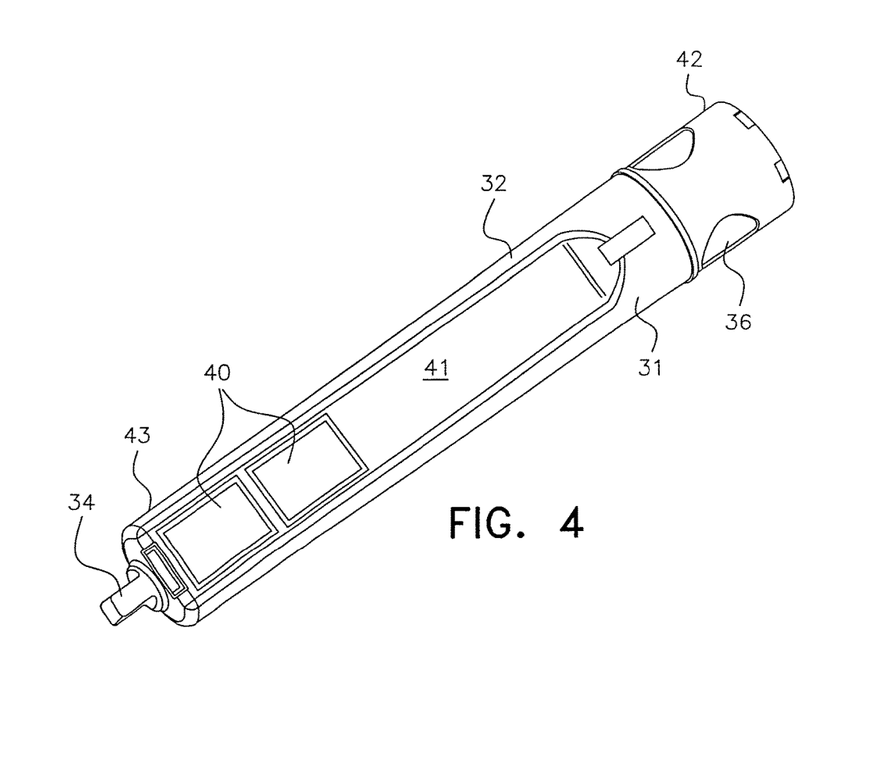
FIG. 4 is a perspective bottom view of the molded tube cartridge of the trap shown in FIG. 3.
Figure 5:
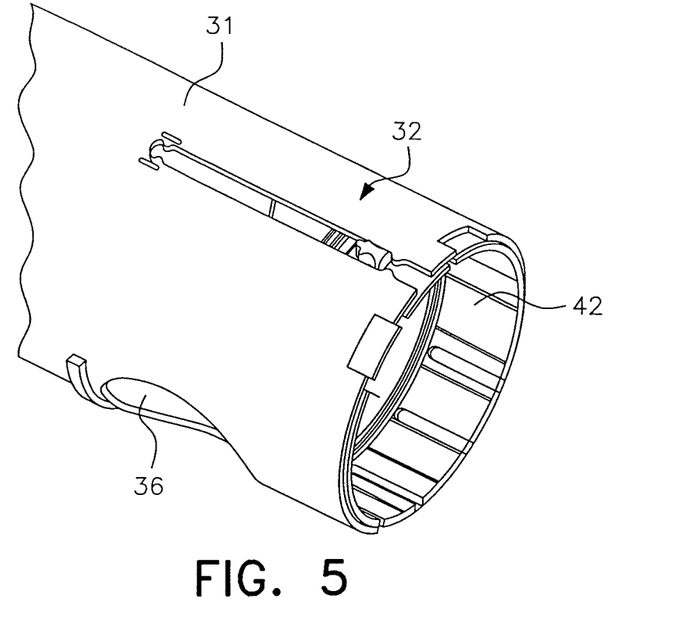
FIG. 5 is an enlarged view of the geared end of the molded tube cartridge of FIG. 4.

The tube cartridge 32, which is preferably made of molded plastic, includes a mouse entry opening 36 at a first end 42 that aligns with a corresponding entry door 38 on the housing 30. A pair of spaced killing plates 40 are positioned at the opposite second end 43 of the tube adjacent a bait cup 34. The killing plates 40 are preferably insert molded into the lower floor 41, which forms the flat side of the D-shaped portion of the tube, so as to be exposed on both the inside and the outside of the tube 32.

Figure 6:
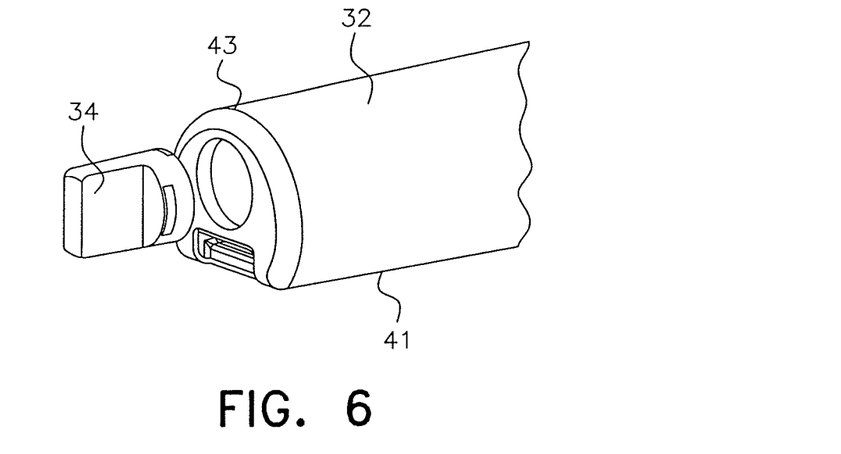
FIG. 6 is an enlarged view of the opposite end, with respect to the geared end shown in FIG. 5, of the molded tube cartridge of FIG. 4, shown with the tube cartridge right side up and the bait cup removed.

The bait cup 34, best shown in FIG. 6, is preferably mounted in the second end 43 of the tube with a quarter-turn bayonet mount that can be twisted out by hand, loaded with peanut butter or other suitable bait, and then put back in to act as a lure directing the mouse into the tube cartridge 32.

The first end 42 of the tube 32 is adjacent a geared motor 46 mounted in the housing 30 to move the plug 35. Once activated, the geared motor 46 turns a lead screw which extends a platen 45 to push the plug 35 toward the second end 43 and past the mouse entry openings 36 to effectively seal the tube in the cylindrical part 31 thereof. The plug 35 preferably has a thin rubber lip or cupped seal on the edge thereof to enhance sealing.

As in the first embodiment, a mouse entering the tube 32 is detected, such as by contact with both plates, a sensor, or the like, and electrocuted by activation of the killing plates 40. Once the killing cycle is completed, the tube with the mouse sealed therein can be thrown away without exposing the user to the dead mouse and/or any pathogens associated therewith.

Closure of the tube or, in the case of the first embodiment rotation of the cartridge, can occur before, during or after initiation of the high voltage killing cycle, but is preferably completed before. However, if the trap is configured to close the tube or rotate the cartridge after the killing cycle is completed, the trap may be further configured to detect whether or not a mouse is still present after the high voltage has been applied and, in the event the mouse has escaped, the trap may be configured to automatically rearm. Such rearming capability is fully disclosed in U.S. Pat. No. 6,836,999 ("the '999 patent"), which is commonly owned by the assignee of the present application. The '999 patent is hereby expressly incorporated by reference as if fully set forth herein.

According to a third embodiment, the tube 50 is made of paper or cardboard as depicted in various configurations illustrated in FIGS. 7-10. The paper tubes 50 are used in a housing such as that shown in the second embodiment. The paper or cardboard tubes can be coated with wax or plastic, or impregnated therewith, to enhance sealing.

Figure 7:
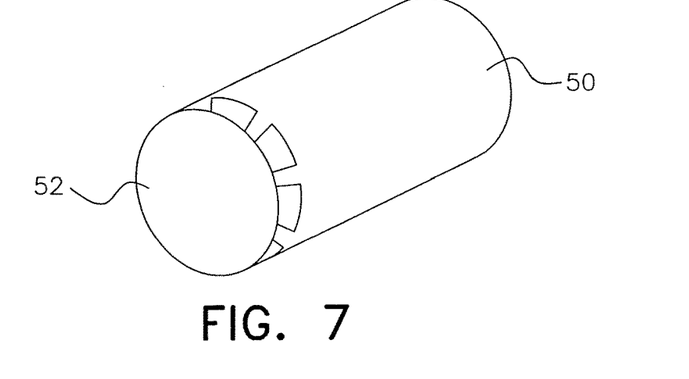
FIG. 7 is a perspective view of a paper or cardboard tube for use in a third embodiment of a hermetically sealing mousetrap in accordance with the present invention, shown with the tube end covered by a coated paper or cardboard cap applied with adhesive.
Figure 8:
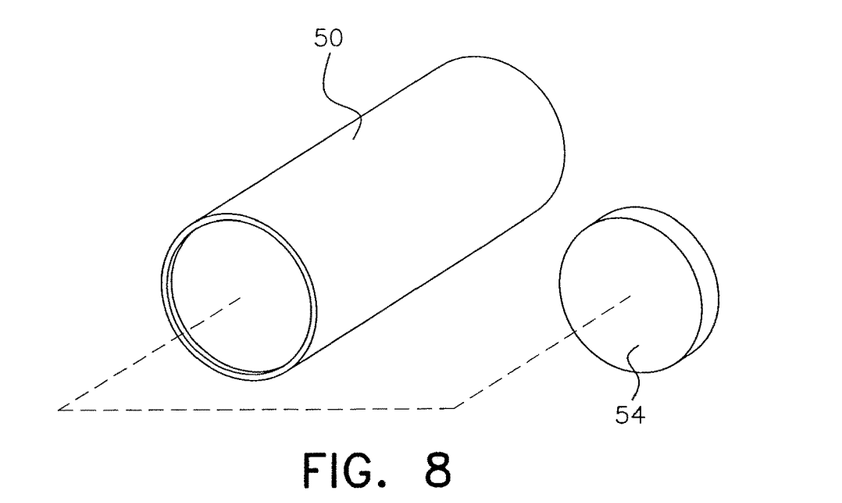
FIG. 8 is an exploded perspective view of a paper tube like that shown in FIG. 7 but with the end closed by a coated paper plug pressed into the end and held with adhesive.
Figure 9:
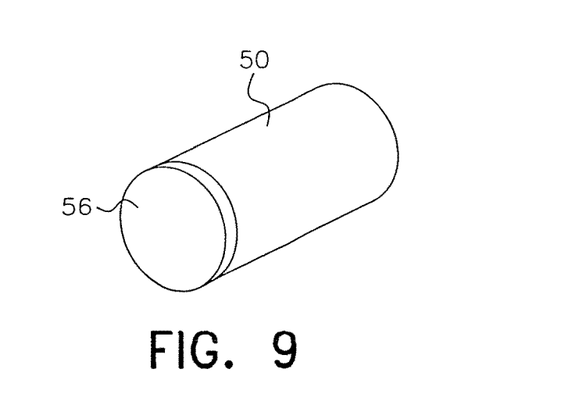
FIG. 9 is a perspective view of a paper tube like that shown in FIGS. 7 and 8, but with the end closed by a low-temperature shrink wrap cap.
Figure 10:
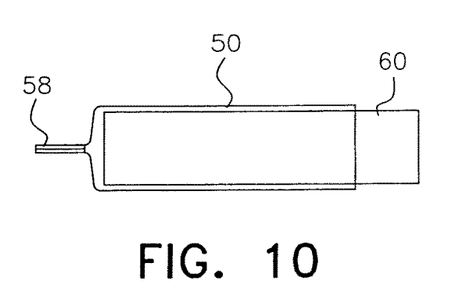
FIG. 10 is a side view of a paper tube like that shown in FIGS. 7-9, in which the tube end is closed by pressing opposite sides of the tube together and then securing them against one another with glue or the like, while the remainder of the tube is retained in a tubular configuration by a mandrel.
Figure 10A:
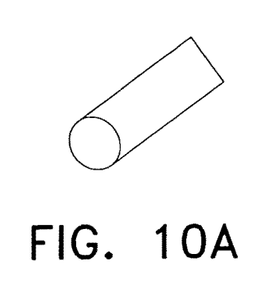
FIG. 10A is a perspective view of the paper tube of FIG. 10 with the end pressed closed.

In a first configuration shown in FIG. 7, one end of the tube 50 is sealed with a coated paper cap 52 applied with adhesive or the like. FIG. 8 shows a second configuration in which the paper tube end is closed by a coated paper plug 54 pressed into the tube end and held with adhesive. Yet a third configuration is illustrated in FIG. 9, in which the tube end is closed by a low-temperature shrink wrap cap 56. Finally, FIGS. 10 and 10A show another configuration in which the tube end 58 is closed by pressing opposite sides of the tube together and then gluing them to one another. To prevent the body of the tube from being crushed when the sides of the tube end are pressed together, a mandrel 60 can be inserted within the tube to hold its shape.

Figure 11:
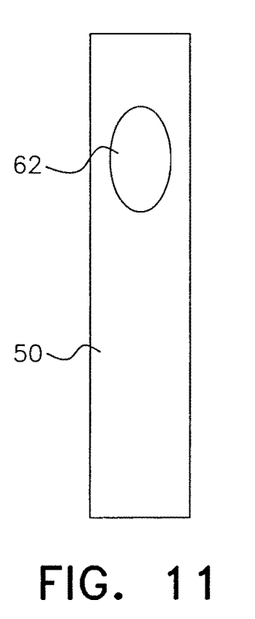
FIG. 11 is a side view of any of the paper tubes shown in FIGS. 7-10, showing the side-positioned rodent access opening.
Figure 12:
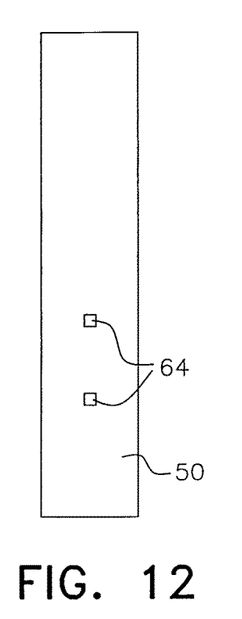
FIG. 12 is a bottom view of the paper tube shown in FIG. 11, showing two cut-out slots for accommodating the contact points of the killing plates contained within the tube.

FIG. 11 is a side view of a paper tube 50 such as any of the configurations shown in FIGS. 7-10. A rodent entrance opening 62 is provided in one side of the tube, while the bottom of the tube has cut-out slots 64 for the killing plate contact points 66 as shown in FIG. 12.

Figure 13:
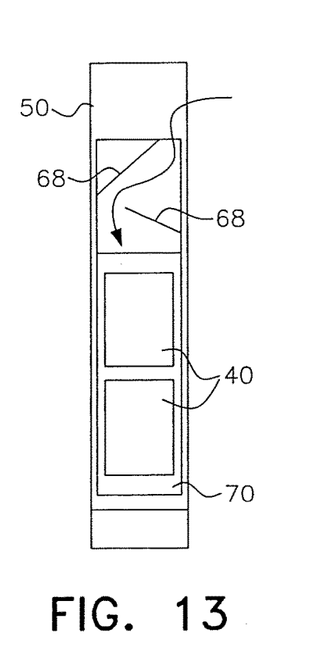
FIG. 13 is a top cutaway view of the interior of the paper tube of FIGS. 11 and 12, showing the killing plates mounted in a frame and including baffles for directing the mouse to such plates.

A representative interior of the paper tubes 50 is shown in FIG. 13. A mouse entering the rodent entrance opening 62 is directed toward a pair of killing plates 40, preferably by plates or baffles 68 positioned inside the tube 50 that cause the rodent to move along a specified path. A full description of such baffles as used in an electronic trap is set forth in U.S. Pat. No. 6,735,899, which patent is commonly owned by the assignee of the present application and is hereby incorporated by reference in its entirety as if fully set forth herein.

Figure 14:
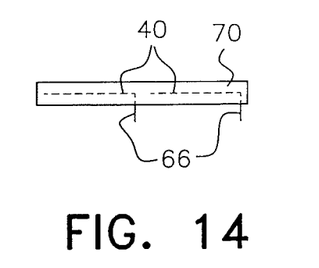
FIG. 14 is a side view of the frame and killing plates of FIG. 13.
Figure 15:
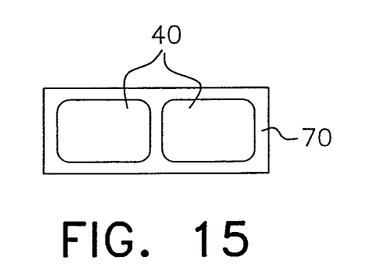
FIG. 15 is a top view of the frame and killing plates of FIG. 14 in which the plates are insert-molded into the frame.
Figure 16:
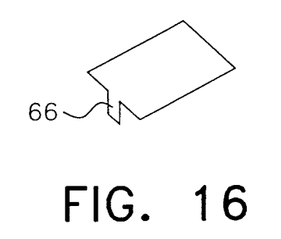
FIG. 16 is a perspective view of the frame of FIG. 14, showing the killing plate contact points that extend through the slots in the bottom of the tube.
Figure 17:
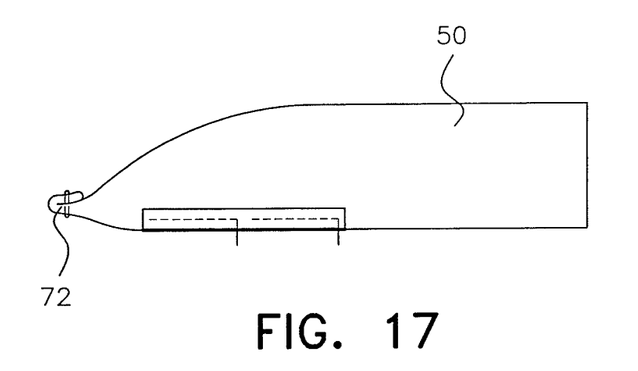
FIG. 17 is a side view of a further paper tube configuration in which the tube end is folded over upon itself and stapled, and the killing plates are held in the frame with adhesive.

The killing plates 40 are located in the end of the tube opposite the entrance opening, and behind the baffles 68, to minimize any opportunity for the rodent to escape. The killing plates 40 are preferably mounted in a frame 70, preferably by insert molding as shown in FIGS. 14 and 15 or, alternatively, the killing plates can be held in place within the frame 70 using adhesive as shown in the configuration of FIG. 17. In either case, each of the killing plates 40 has an associated contact point 66 as shown in FIG. 16. The contact points 66 are connected by respective wires or other contacts (not shown) to the high voltage circuit used to activate the plates.

As a further configuration, in the trap tube shown in FIG. 17, the tube end 72 is closed by folding it over upon itself and then securing the folded portion in place, such as by stapling.

Figure 18:
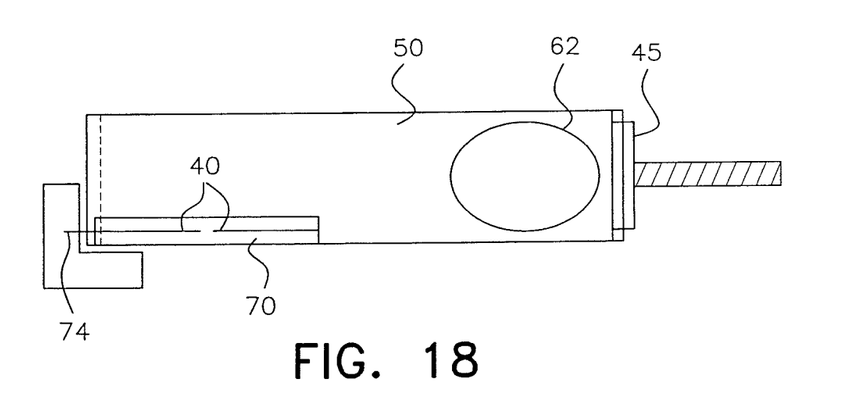
FIG. 18 is a side view of another paper tube like that shown in FIGS. 11-13, but with contact points on the tube end.

FIG. 18 is a side view of another paper or cardboard tube 50 like that shown in FIGS. 11-13, but with the contact points 74 on the tube end. Insertion of the tube into the housing electrically connects the contact points with the high voltage killing circuit contained within the housing. As in the second embodiment (see FIG. 3), a platen 45 driven by a motor within the housing moves a plug past the entry opening 62 to seal the tube.

Figure 19:
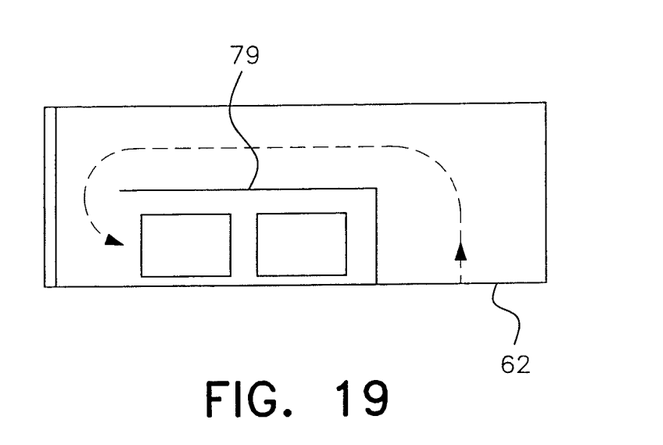
FIG. 19 is a top view of yet another embodiment of a hermetically sealing mousetrap having a divider that allows the cartridge to be shorter in accordance with the present invention.
Figure 20:
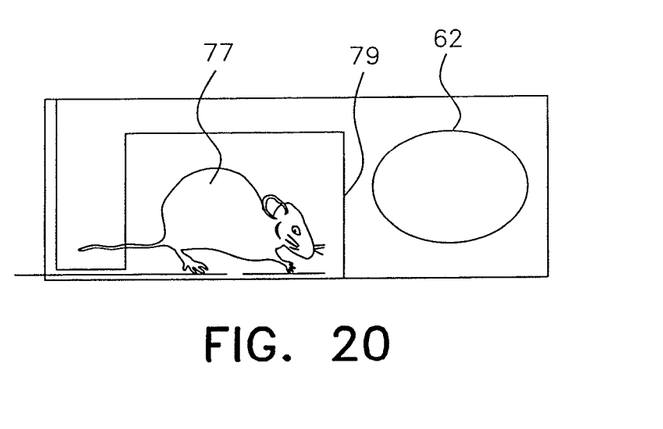
FIG. 20 is a side view of the trap shown in FIG. 19.

FIGS. 19 and 20 show top and side views, respectively, of a fourth embodiment of a hermetically sealing mousetrap in accordance with the present invention. In this embodiment, the trap is shorter with a divider 79 therein that forces the mouse to make a U-turn inside the trap. Since a mouse is approximately six inches long from nose to tail, fully enclosing a mouse that is moving in one direction would require a long cartridge. By forcing the mouse to turn after entering the trap, as indicated by the dotted line in FIG. 19, the mouse 77 is positioned as shown in FIG. 20, with the tail no longer straight out behind the body. Hence, the divider 79 allows a shorter cartridge, even one as short as about three inches, to still be effective in completely containing the mouse.

Figure 21:
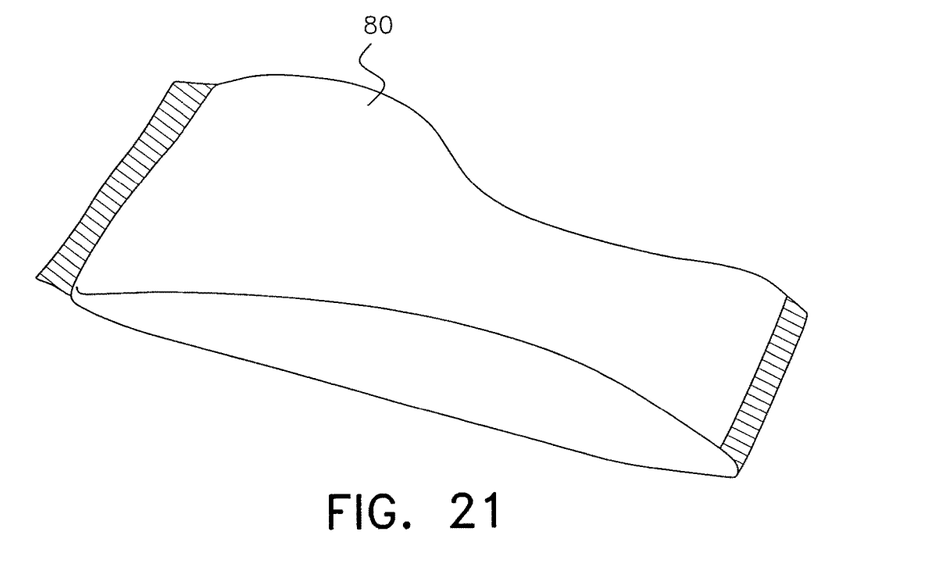
FIG. 21 is a perspective view of a still further embodiment of a hermetically sealing trap in accordance with the present invention in which the body of the disposable cartridge is a sturdy collapsible bag which becomes heat-sealed after shock and capture.
Figure 22:
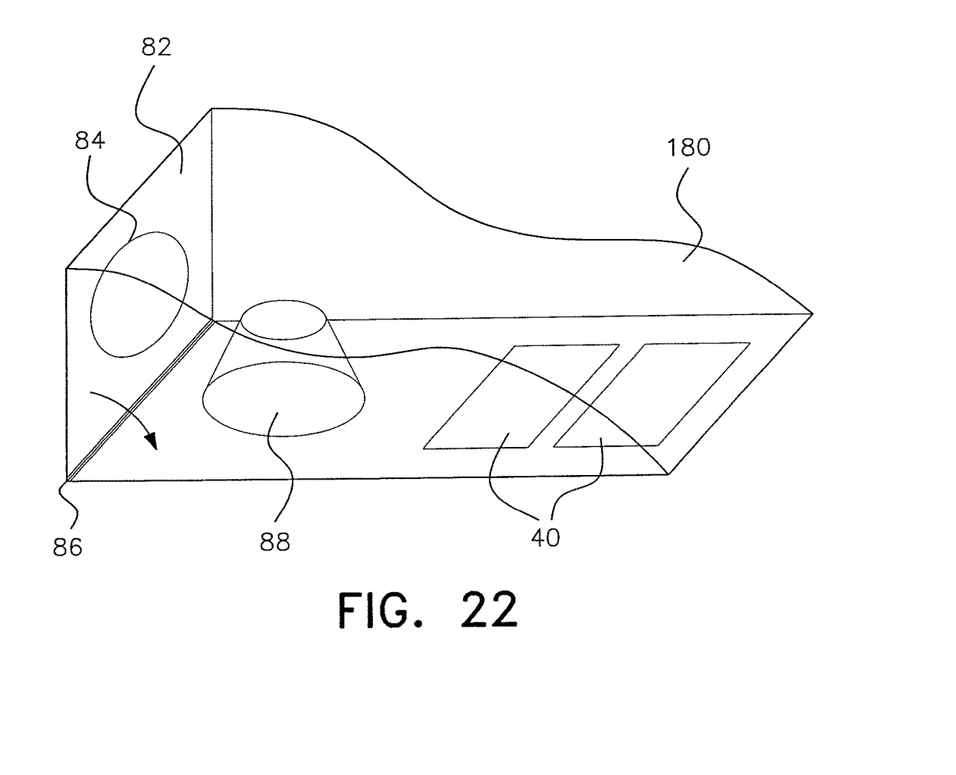
FIG. 22 is a perspective view of another collapsible body bag style cartridge in accordance with the present invention, with the bag shown transparently to reveal the internal components of the bag.

FIGS. 21 and 22 show fifth and sixth embodiments of a hermetically sealing trap in accordance with the present invention in which the cartridge is a collapsible bag 80, 180 that defines an enclosure containing a pair of killing plates 40 and associated circuitry (not shown). As in the other embodiments, each of the bags is received within a housing (not shown). The body bag 80 shown in FIG. 21 is heat sealed with the mouse carcass inside using appropriate mechanisms associated with the housing.

In the sixth embodiment shown in FIG. 22, the end of the bag 180 has an entry wall 82 with a rodent entrance opening 84 therein. The entry wall 82 is connected to the body of the bag by a living hinge 86 that can be "opened" to place the entry wall into a generally vertical orientation in which a rodent entrance opening becomes accessible to a rodent. When the trap is tripped and the killing plates activated, the entry wall 82 collapses on the hinge 86 and the entrance opening 84 is plugged by a sealing element 88. A motor-driven mechanism within the housing may be used to collapse the entry wall 82 and form the seal with sealing element 88. Upon capture of a mouse, the cartridge or body bag 180 is thrown away with the mouse sealed inside.

The various embodiments shown herein are representative and may be further modified as would be understood by the skilled person from this disclosure. In each case, the trap includes a reusable housing and a hermetically sealing cartridge, chamber or enclosure having high-voltage killing plates contained therein for rapidly and humanely killing a rodent. The cartridge can thereafter be readily disposed of with the dead mouse inside.

As used herein, the terms "hermetically sealed" and "hermetic seal" are intended to mean a closed trap having a vacuum inside the trap enclosure, such as enclosure 16, of between about 1.0 mmHg and about 25.9 mmHg. Stated another way, the seal can withstand a pressure of between at least 0.125 inches H₂O to about 55.4 inches H₂O. As known to those skilled in the art, these parameters can be measured using a leak and flow tester such as the SPRINT-LC manufactured by Uson LP of Houston, Tex.

The traps as described herein are both humane, killing the mouse in typically less than 30 seconds, and safe for both persons and pets around the trap. The traps can be baited and set from outside the enclosure, although during testing it has been found that baiting is not necessary as mice are naturally curious about small dark spaces such as that created by the housing. The user never has to see the dead mouse, and the traps securely contain all bacteria, parasites, urine, feces, etc., associated with the mouse indefinitely, making the traps suitable for use in locations that may not be convenient for regular servicing.

While the killing mechanism described herein is a high-voltage electrocuting mechanism, the present invention may also be modified to include one of several other alternative killing/incapacitating mechanisms known in the art while retaining the hermetic sealing operation of the trap.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A sealing mousetrap comprising:
    a reusable housing having power and control components and a cartridge-receiving compartment;
    a sealable cartridge for trapping a mouse, said cartridge being removably fitted within said cartridge-receiving compartment of said housing when the trap is assembled for use;
    a closing mechanism for sealing said cartridge when a mouse is detected therein;
    a high voltage killing mechanism including an electrically conductive component associated with said cartridge, said high voltage killing mechanism being activated by said power and control components to apply voltage to the electrically conductive component to complete a killing cycle by electrocution when a mouse is detected in said cartridge; and
    said sealed cartridge being removable from said housing for disposal with its contents sealingly contained therein after said killing cycle.

2. The hermetically sealing mousetrap as set forth in claim 1, wherein said cartridge includes a tube having an access opening and said closure mechanism is configured to seal said access opening when the trap is tripped.

3. The hermetically sealing mousetrap as set forth in claim 2, wherein said tube is a molded member and said closure mechanism includes a plug positioned adjacent said access opening, said housing having a motor-driven driving mechanism, said tube being received within said housing and said tube access opening being aligned with an access opening in said housing when the trap is set and, when the trap is tripped, said driving mechanism pushing said plug to close said tube and seal a rodent in said cartridge.

4. The hermetically sealing mousetrap as set forth in claim 3, wherein said plug is fitted within one end of said tube and said tube access opening is on a side of the tube, said driving mechanism pushing said plug further into said tube until said tube access opening is closed by said plug, sealing the cartridge for disposal thereof with its contents inside.

5. A sealing mousetrap comprising:
    a reusable housing;
    a sealing single-use enclosure fitted within said housing, said single-use enclosure having a rodent access opening and containing an electrically conductive component operative with a high voltage killing mechanism for killing a rodent by electrocution;

an associated closure mechanism for closing the access opening to sealingly enclose the rodent in said enclosure; and said housing having power and control components configured to activate the closure mechanism to automatically close the access opening of the single-use enclosure while said enclosure is fitted within said housing to place said enclosure in a sealed condition, and further configured to activate said high voltage killing mechanism to apply voltage to the electrically conductive enclosure component for a killing cycle, said enclosure being configured to be disengaged and removed from said housing in said sealed condition for disposal with its contents therein.

6. The hermetically sealing mousetrap as set forth in claim 5, wherein the electrically conductive component of said killing mechanism includes a pair of high voltage plates in the enclosure for electrocuting the rodent.

7. The hermetically sealing mousetrap as set forth in claim 5, wherein said enclosure includes a molded tube having an access opening, said closure mechanism includes a plug positioned adjacent said access opening, and said housing includes a driving mechanism, said tube being received within said housing and said tube access opening being aligned with an access opening in said housing when the trap is set and, when the trap is tripped, said driving mechanism pushing said plug into said tube to close said access opening and seal a rodent in said enclosure.

* * * * *